United States Patent
Tait

(10) Patent No.: US 11,529,843 B2
(45) Date of Patent: Dec. 20, 2022

(54) REAR SEAT CLIMATE CONTROL

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 244 days.

(21) Appl. No.: 16/720,874

(22) Filed: Dec. 19, 2019

(65) Prior Publication Data

US 2021/0188038 A1    Jun. 24, 2021

(51) Int. Cl.
    *B60H 1/00*    (2006.01)
    *B60H 1/24*    (2006.01)
    *B60H 1/34*    (2006.01)

(52) U.S. Cl.
    CPC ..... *B60H 1/00285* (2013.01); *B60H 1/00564* (2013.01); *B60H 1/246* (2013.01); *B60H 1/3407* (2013.01)

(58) Field of Classification Search
    CPC B60H 1/00285; B60H 1/00564; B60H 1/246; B60H 1/3407
    USPC .......................................................... 454/120
    See application file for complete search history.

(56) References Cited

U.S. PATENT DOCUMENTS

| | | | |
|---|---|---|---|
| 2,055,843 A * | 9/1936 | Helfinstine | B60H 1/247 237/12.3 A |
| 10,479,241 B2 * | 11/2019 | Filipkowski | B60N 2/22 |
| 2005/0264086 A1 | 12/2005 | Lofy | |
| 2012/0256450 A1 * | 10/2012 | Sahashi | B60N 2/5635 297/180.14 |

FOREIGN PATENT DOCUMENTS

| | | | | |
|---|---|---|---|---|
| DE | 4112631 C1 * | 4/1992 | | |
| FR | 2843916 A1 * | 3/2004 | ........... | B60N 2/5657 |
| GB | 2208542 A * | 4/1989 | ............... | A47C 7/74 |
| KR | 20170002012 A | 1/2017 | | |

* cited by examiner

*Primary Examiner* — Allen R. B. Schult
(74) *Attorney, Agent, or Firm* — Barnes & Thornburg LLP

(57) ABSTRACT

A vehicle includes a front-row occupant support and a rear-row occupant support. The front-row occupant support includes a climate-control system arranged in the front-row occupant support. The climate control system is configured to provide a conditioned airflow moving from the front-row occupant support toward a rear-row occupant region between the front-row occupant support and the rear-row occupant support.

8 Claims, 4 Drawing Sheets

REAR SEAT CLIMATE CONTROL

BACKGROUND

The present disclosure relates to occupant supports, and particularly to occupant supports with climate control. More particularly, the present disclosure relates to occupant supports with integrated climate control for passengers in second and third rows of a vehicle.

SUMMARY

According to the present disclosure, a vehicle includes a front-row occupant support and rear-row occupant support. A rear-row occupant region is located directly behind the front-row occupant support between the front-row occupant support and the rear-row occupant support. Each occupant support includes its own seat bottom and seat back. The seat back is coupled to the seat bottom and extends upwardly away from the seat bottom. The seat back may include a backrest and a headrest that is coupled to the backrest.

In illustrative embodiments, the front-row occupant support further includes a climate-control system that provides a conditioned airflow into the rear-row occupant region associated with the front-row occupant support. The backrest has a rearward-facing surface that is formed to include a plurality of air-discharge openings that open toward the rear-row occupant region. Each of the air-discharge openings are in fluid communication with a plurality of conditioned-air passageways that extend through the backrest. Occupants seated on a rear-row occupant support are in the rear-row occupant support region and receive a conditioned air flow discharged from each of the air-discharge openings.

In illustrative embodiments, the climate-control system includes a plurality of conditioned-air passageways, a conditioned-air source, and a conditioned-air supply system. The plurality of conditioned-air passageways extend through the backrest of each front-row occupant support. In some embodiments, conditioned-air passageways may also extend through seat backs of the rear-row occupant supports if the vehicle includes more than one row of rear-row occupant supports.

In illustrative embodiments, the conditioned-air source may be a centralized heating, ventilation, and air conditioning system (HVAC) of the vehicle that supplies the conditioned airflow through a conduit in a floor of the vehicle to the backrest. The conditioned-air supply system is configured to transfer the conditioned airflow through the backrest and deliver the conditioned airflow to the rear-row occupant region immediately behind each occupant support in which the climate-control system is included.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
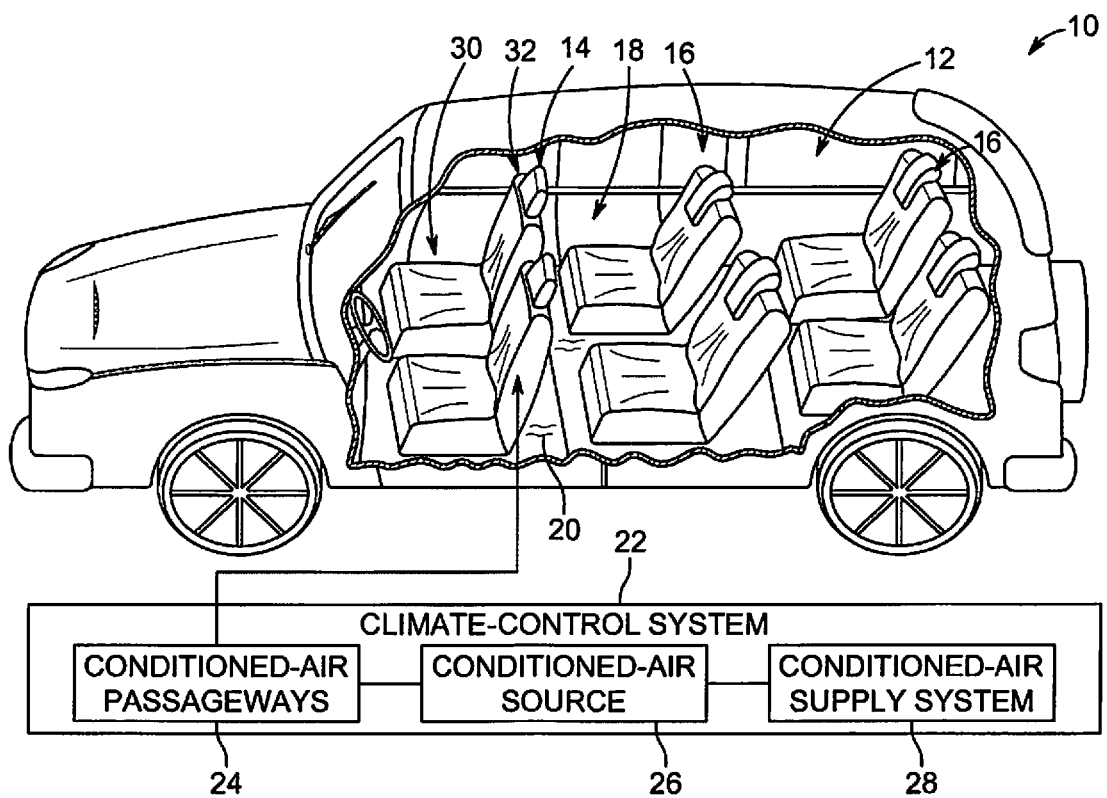
FIG. 1 is a perspective and diagrammatic view of a vehicle with a portion of the vehicle broken away to show a pair of front-row occupant supports and several rear-row occupant supports positioned behind the front-row occupant support and showing that the front-row occupant supports include a rear-row climate control system arranged within a seat back of the front-row occupant supports to deliver a conditioned airflow through a plurality of air-discharge openings formed in the seat back to a rear-row occupant region located directly behind the front-row occupant supports.

An illustrative vehicle 10 is embodied as an automobile, in accordance with the present disclosure, and provides a cabin 12 that houses a plurality of occupant supports 14, 16 as shown in FIG. 1. The plurality of occupant supports include a front-row occupant supports 14 and rear-row occupant supports 16. A rear-row occupant region 18 is located directly behind the front-row occupant supports 14 between the front-row occupant supports 14 and the rear-row occupant supports 16. Occupants seated on a rear-row occupant support 16 are in the rear-row occupant region 18 and receive a conditioned air flow 20 from a climate-control system 22.

Each of the front-row occupant supports 14 includes its own climate-control system 22 to provide the conditioned air flow 20 to each occupant seated on the rear-row occupant supports 16 directly behind the front-row occupant supports 14 as shown in FIG. 1. The vehicle 10 may include more than one row of rear-row occupant supports 16. Accordingly, the rear-row occupant supports 16 may also include a climate-control system 22 to deliver the conditioned air flow 20 to each rear-row occupant support 16.

Figure 2:
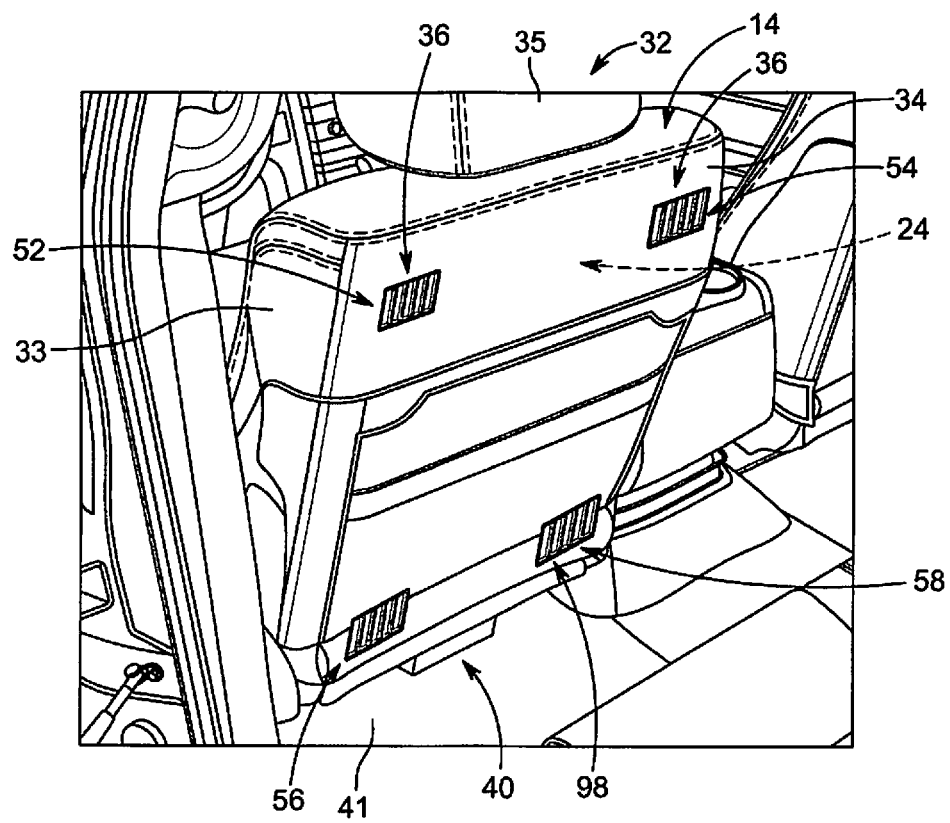
FIG. 2 is an enlarged perspective view of one of the front-row occupant supports showing the air-discharge openings formed in the seat back and facing directly toward the rear-row occupant region, the air-discharge openings positioned in outermost corner sections of the seat back so as not to interfere with a rear-row occupant.

The climate-control system 22 includes a plurality of conditioned-air passageways 24, a conditioned-air source 26, and a conditioned-air supply system 28 as shown in FIG. 1. The plurality of conditioned-air passageways 24 extend through a seat back 32 of each front-row occupant support 14. Conditioned-air passageways 24 may also extend through seat backs 32 of the rear-row occupant supports 16 if the vehicle 10 includes more than one row of rear-row occupant supports 16 as shown in FIG. 1. The conditioned-air source 26 may be a centralized heating, ventilation, and air conditioning system (HVAC) of the vehicle 10 that supplies the conditioned air flow through a conduit 40 in a floor 41 of the vehicle as shown in FIG. 2. The conditioned-air supply system 28 is configured to transfer the conditioned airflow through the seat back 32 and deliver the conditioned airflow to the rear-row occupant region 18 immediately behind each occupant support 14, 16 in which the climate-control system 22 is provided. In some embodiments, the conditioned-air supply system 28 and the conditioned-air source 26 cooperate to provide a stand-alone system separate from the vehicle's 10 HVAC system for each individual occupant support 14, 16.

Figure 3:
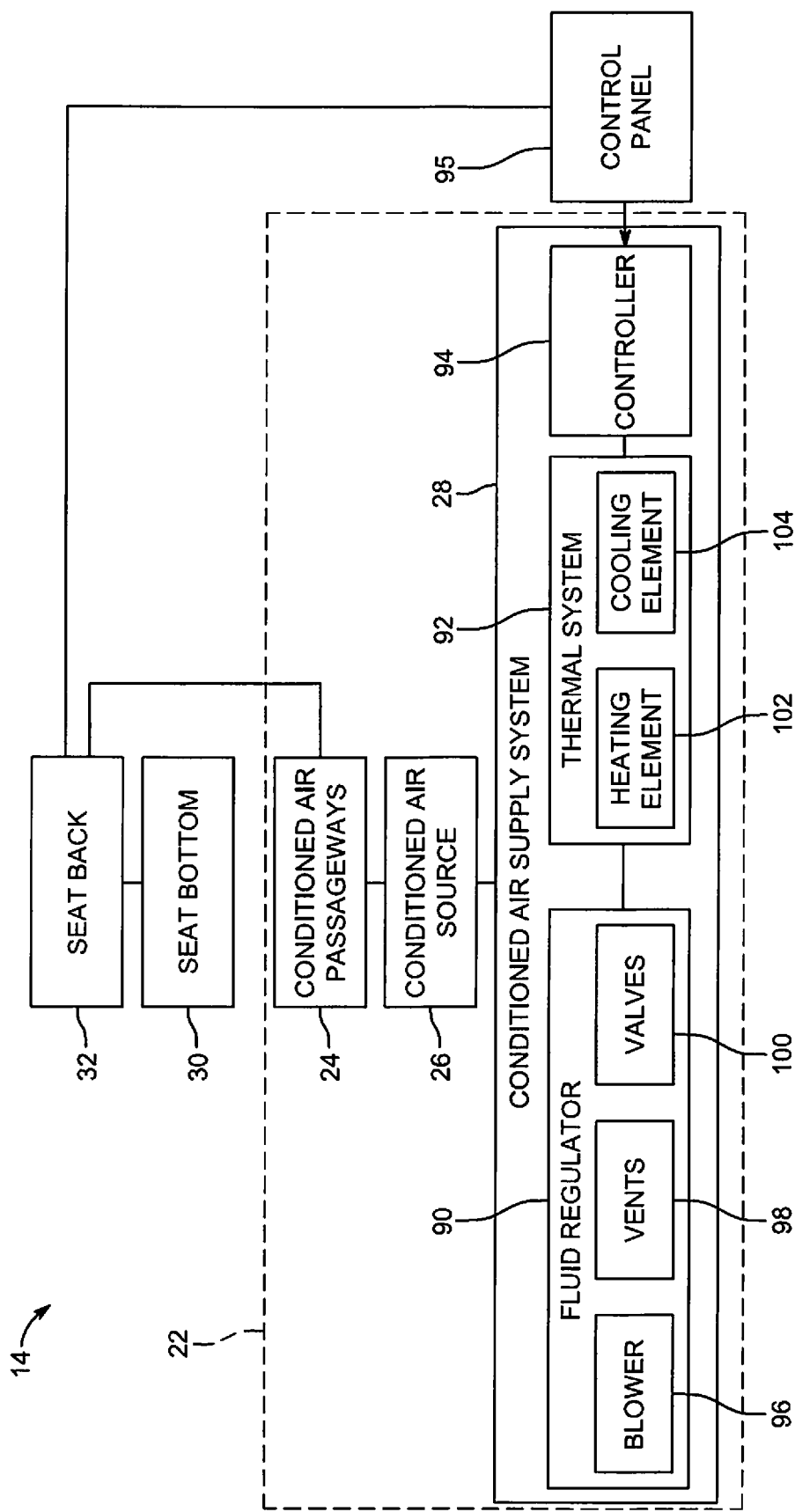
FIG. 3 is a diagrammatic view of the climate control system from FIG. 1 including the plurality of conditioned air passageways, a conditioned-air source, and a conditioned-air supply system that has a fluid regulator for delivering the conditioned airflow to the rear-row occupant region, a thermal system for conditioning the conditioned air flow, and a controller that receives user inputs from a control panel and outputs command signals to the fluid regulator and the thermal system to adjust the conditioned air flow.

Each front-row occupant support 14 includes its own seat bottom 30, seat back 32, and climate-control system 22 as shown in FIGS. 1-3. The seat back 32 is coupled to the seat bottom 30 and extends upwardly away from the seat bottom 30. The seat back 32 has a rearward-facing surface 34 that is formed to include a plurality of air-discharge openings 36 that open toward the rear-row occupant region 18. Each of the air-discharge openings 36 are in fluid communication with the plurality of conditioned-air passageways 24. The climate-control system 22 is configured to transfer the conditioned airflow through the conditioned-air passageways 24 and out of the air-discharge openings 36 into the rear-row occupant region 18.

Figure 4:
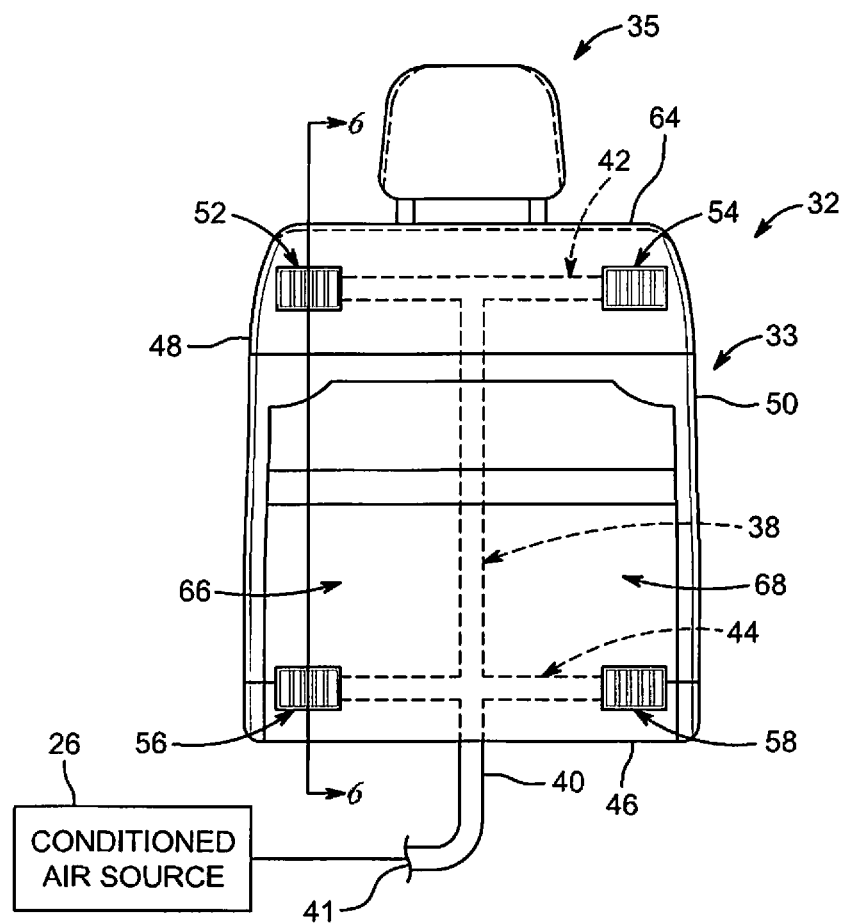
FIG. 4 is an elevation view of the seat back looking forward toward the seat back of the front-row occupant support and showing that each of the air-discharge openings are interconnected by a plurality of conditioned-air passageways that extend through the seat back of the front-row occupant support.

The plurality of conditioned-air passageways 24 direct the conditioned airflow to each of the air-discharge openings 36 and include a vertical passageway 38, a first lateral passageway 42, and a second lateral passageway 44 as shown in FIG. 4. The vertical passageway 38 is fluidly connected to the conduit 40 and receives the conditioned airflow from the conditioned-air source 26 there through. The first lateral passageway 42 is fluidly connected to a distal end of the vertical passageway 38 and extends horizontally through an upper region of the seat back 32. The second lateral passageway 44 is fluidly connected to the vertical passageway 38 and extends horizontally through a lower region of the seat back 32. The conduit 40 supplying the conditioned airflow to the plurality of conditioned-air passageways 24 extends upward from the floor 41 to a lower surface 46 of the front-row occupant support 14. The lower surface 46 may be a lower surface of the seat bottom 30 or a lower surface of the backrest 33.

In some embodiments, the conditioned-air supply system 28 is configured to regulate and deliver air from the conditioned-air source 26 to the plurality of conditioned-air passageways 24 to provide a user-desired conditioned airflow as suggested in FIG. 3. The conditioned-air supply system 28 includes a fluid regulator 90, a thermal system 92, and a controller 94. The fluid regulator 90 controls flow of the conditioned airflow through the conditioned-air passageways 24 and the air-discharge openings 36. The thermal system 92 controls various properties of the conditioned airflow such as temperature, humidity, and flow rate, for example. The controller 94 controls operation of the fluid regulator 90 and the thermal system 92 based on user inputs into a control panel 95 to provide the user-desired conditioned airflow.

The controller 94 includes a processor and a memory storage device storing instructions that, when executed by the processor, cause the fluid regulator 90 and the thermal system 92 to deliver the user-desired conditioned airflow based on the user inputs entered in the control panel 95. The control panel 95 may be a touchscreen or an interface with a plurality of buttons or knobs for use by occupants to change the properties of the conditioned airflow. Entering user inputs into the control panel 95 sends input signals to the controller 94. Upon receipt of the input signals, the controller 94 analyses the input signals and sends one or more output signals to the fluid regulator 90 and the thermal system 92 to cause the fluid regulator 90 and the thermal system 92 to condition the airflow and provide the user-desired conditioned airflow. The user-desired conditioned airflow is sent through the plurality of conditioned-air passageways 24 and out of the air-discharge openings 36 into the rear-row occupant region.

The conditioned-air supply system 28 is arranged entirely within and/or on the seat back 32. The control panel 95 may be mounted on seat back 32 as shown in FIG. 3, such as on the rearward-facing surface 34, for example. In other embodiments, the control panel 95 may be located in another accessible location within reach of occupants in the rear-row occupant region 18 such as a center console in the vehicle, for example.

The fluid regulator 90 may include a blower 96, a plurality of vents 98, and a plurality of valves 100 as shown in FIG. 3. The blower 96 may be a blower included in the vehicle's HVAC system or a separate blower arranged in the seat back 32. The blower 96 pressurizes and moves air through the conditioned-air supply system 28 and the conditioned-air passageways 24. The vents 98 are coupled to the seat back 32 over each of the air-discharge openings 36. The vents 98 may be formed from a rigid material and may be adjustable to direct the conditioned airflow in various directions into the rear-row occupant region 18. Alternatively, the vents 98 may be formed integrally with an outer trim layer of the seat back 32 that is flexible so as not to interfere with occupants in the rear-row occupant region 18. The plurality of valves 100 may be arranged within one or more of the conditioned-air passageways 24 to selectively open and close one or more of the conditioned-air passageways 24. Occupants may enter user inputs into the control panel 95 to open and close the valves 100 to provide a user-desired conditioned airflow out of the air-discharge openings 36 and to modulate a flow rate of the airflow. In some embodiments, the valves 100 may be integrated into the vents 98.

Upon receipt of user inputs in the control panel 95 indicative of a temperature, the controller 94 sends an output signal the thermal system 92 to change the temperature of the airflow accordingly. The thermal system 92 includes a heating element 102 and a cooling element 104 to provide temperature variation for the conditioned airflow as shown in FIG. 3. The heating element 102 may include a plurality of electrically conductive wires that span one or more of the conditioned-air passageways 24 and heat the airflow passing there through. The cooling element 104 may include a heat exchanger or a heat sink arranged in or near one or more of the conditioned-air passageways 24 and remove heat from the airflow passing there through. In some embodiments, the thermal system 92 may include a thermal electric device (TED) that is capable of providing both heating and cooling capabilities such as a Peltier element(s).

The seat back 32 in the illustrative embodiment includes a backrest 33 and a headrest 35. The headrest 35 is separate from the backrest 33 but may be integrated with the backrest 33 in some embodiments. The plurality of conditioned-air passageways 24 extend through the backrest 33 to the plurality of air-discharge openings 36. The plurality of air-discharge openings 36 includes first and second openings 52, 54 fluidly connected to the first lateral passageway 42 and third and fourth openings 56, 58 fluidly connected to the second lateral passageway 44 as shown in FIG. 3. The first and second openings 52, 54 are spaced apart from one another on opposite lateral sides of the seat back 32 in the upper region of the seat back 32 while the third and fourth openings 56, 58 are spaced apart from one another on opposite sides of the seat back 32 in the lower region of the seat back 32.

Figure 5:
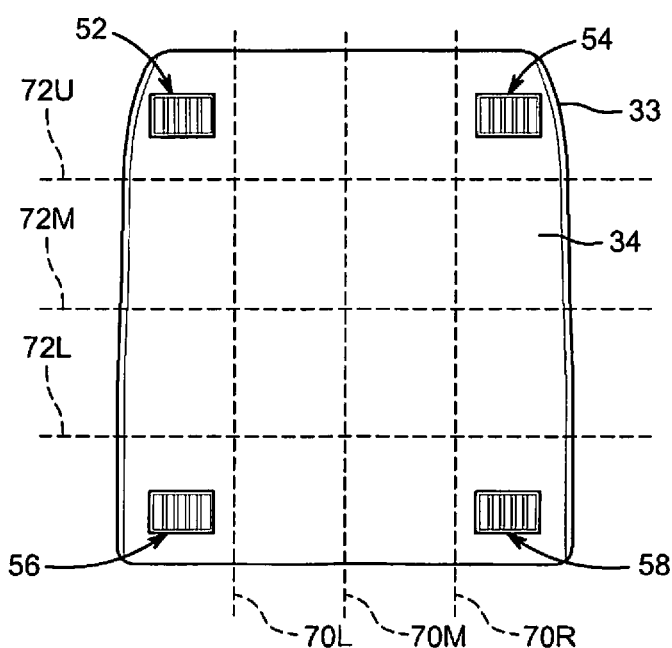
FIG. 5 is a diagrammatic view of the seat back with reference lines that establish a grid to locate the plurality of air-discharge openings in outermost corners of the seat back.

The plurality of conditioned-air passageways 24 and the plurality of air-discharge openings 36 are placed in the seat back in positions where they minimize interference with occupants seated in both the front-row occupant support 14 and the rear-row occupant support 16 as shown in FIGS. 3-5. Each lateral passageway 42, 44 extends horizontally between a first lateral side 48 of the seat back 32 and a second lateral side 50 of the seat back 32. The vertical passageway 38 is positioned midway between the first lateral side 48 of the backrest 33 and the second lateral side 50 of the backrest 33. The vertical passageway 38 connects to the conduit 40 at the lower surface 46 and then extends upwardly through the backrest 33 toward an upper surface 64 of the backrest until it reaches the first lateral passageway 42.

Together, the vertical passageway 38 and the first and second lateral passageways 42, 44 form an I-shaped arrangement as shown in FIG. 3. The I-shaped arrangement of the conditioned-air passageways 24 provides a first clearance space 66 between the vertical passageway 38 and the first lateral side 48 and a second clearance space 68 between the vertical passageway 38 and the second lateral side 50. The first and second clearance spaces 66, 68 provide areas for an occupant in the rear-row occupant region 18 to put his or her knees so that the occupant and the conditioned-air passageways 24 do not interfere with one another.

In the illustrative embodiment, the air-discharge openings 52, 54, 56, 58 are positioned in outermost corners of the rearward-facing surface 34 as shown in FIG. 4. In the diagrammatic view of the backrest 33 shown in FIG. 4, the rearward-facing surface 34 is divided into a plurality of sections by a plurality of reference lines to establish a grid for locating the air-discharge openings 52, 54, 56, 58. The plurality of reference lines include a middle vertical line 70M, a left vertical line 70L, and a right vertical line 70R. The reference lines 70M, 70L, and 70R divide the rearward-facing surface 34 into four equally spaced columns each representing 25 percent of the total area of the rearward-facing surface 34. The plurality of reference lines also include a middle horizontal line 72M, an upper horizontal line 72U, and a lower horizontal line 72L. The reference lines 73M, 72U, and 72L divide the rearward-facing surface 34 into four equally spaced rows each representing 25 percent of the total area of the rearward-facing surface 34.

In the illustrative embodiment, the first air-discharge opening 52 is located above the upper horizontal line 72U and to the left of the left vertical line 70L such that it is located in the uppermost quarter and the leftmost quarter of the backrest 33 as shown in FIG. 5. The second air-discharge opening 54 is located above the upper horizontal line 72U and to the right of the right vertical line 70R such that it is located in the uppermost quarter and the rightmost quarter of the backrest 33. The third air-discharge opening 56 is located below the lower horizontal line 72L and to the left of the left vertical line 70L such that it is located in the bottommost quarter and the leftmost quarter of the backrest 33. The fourth air-discharge opening 58 is located below the lower horizontal line 72L and to the right of the right vertical line 70R such that it is located in the bottommost quarter and the rightmost quarter of the backrest 33. These positions of the air-discharge openings 52, 54, 56, 58 reduce interference with occupants in the rear-row occupant region 18.

Figure 6:
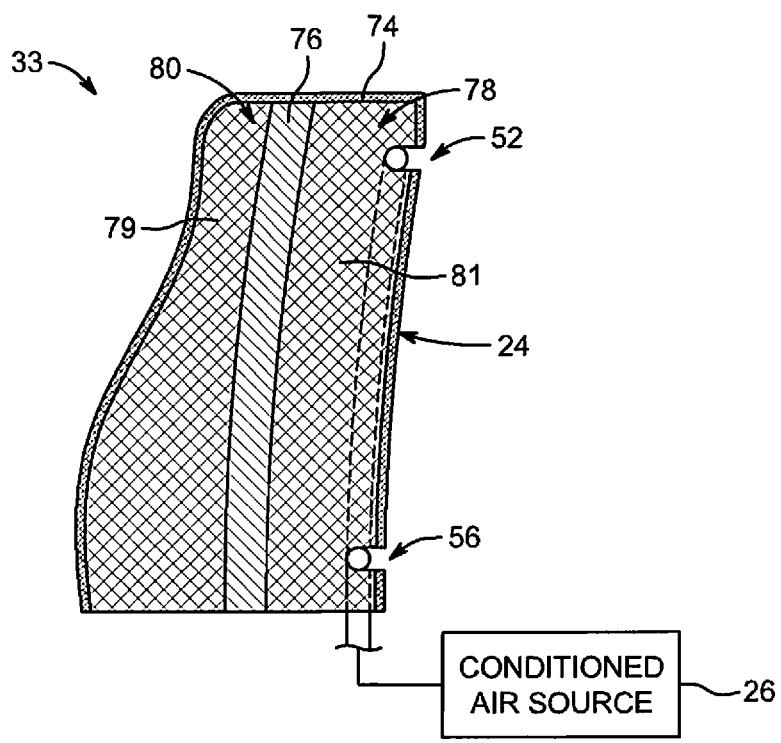
FIG. 6 is a cross section of the seat back taken along line 6-6 in FIG. 4 showing that the seat back includes an outer trim layer, a support layer, and at least one filler layer between the outer trim layer and the support layer, and showing the plurality of conditioned-air passageways formed directly in the filler layer and the air-discharge openings opening through the filler layer and the outer trim layer toward the rear-row occupant region.

The backrest 33 is constructed in a way that minimizes interference with occupants seated on the front-row occupant support 14 as suggested in FIG. 6. The backrest 33 of each front-row occupant support 14 includes an outer trim layer 74, a support layer 76 and at least one filler layer 78 between the outer trim layer 74 and the support layer 76 as shown in FIG. 6. The outer trim layer 74 may be a cloth material, a leather material, or any other suitable material and provides an outermost layer of the backrest 33. The outer trim layer 74 at least partially defines an interior region 80 of the backrest 33. The vents 98 may be formed into the outer trim layer 74 by Cover Carving Technology (CCT) such that the vents 98 and the outer trim layer 74 are formed as an integrated, single part. The support layer 76 is arranged within the interior region 80 and provides support for the seat back 32. Although not shown in FIG. 6, the support layer 76 is coupled to the seat bottom 30 and extends upwardly from the seat bottom 30 to maintain the seat back 32 in an upright position relative to the seat bottom 30. The filler layer 78 is located between the outer trim layer 74 and the support layer 76 to provide cushioning for occupants seated on the occupant support 14. The filler layer 78 is illustratively a foam material such as a polyurethane foam material or a polyethylene foam material.

The illustrative backrest 33 includes a first filler layer 79 and a second filler layer 81 as shown in FIG. 6. The first filler layer 79 is positioned between the outer trim layer 74 and the support layer 76 on a forward side of the support layer 76. The second filler layer 81 is positioned between the outer trim layer 74 and the support layer 76 on a rearward side of the support layer 76. The plurality of conditioned-air passageways 24 are formed directly into the filler layer 81 between the outer trim layer 74 and the support layer 76 on a rearward side of the support layer 76. This arrangement of the layers in the backrest 33 provides the support layer 76 as a barrier between the occupant and the plurality of conditioned-air passageways 24 to reduce interference and improve comfort for the occupant.

Figure 7:
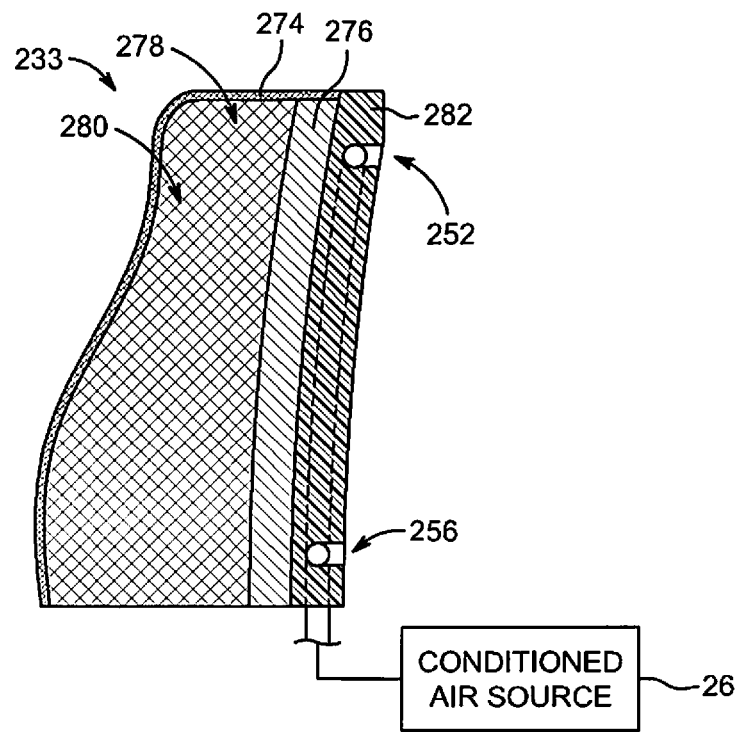
FIG. 7 is a cross section of another embodiment of a seat back with the climate control system shown in FIGS. 1-3, showing that the seat back includes an outer trim layer, a support layer, and a back panel that forms a boundary of the rear-row occupant region and is formed to include the plurality of conditioned-air passageways and the plurality of air-discharge openings therein.

Another embodiment of a backrest 233 that may be used in front-row occupant support 14 is shown in FIG. 7 and, similarly to the backrest shown in FIG. 6, reduces interference with occupants seated on the front-row occupant support 14. The backrest 233 shown in FIG. 7 is similar to backrest 33 of FIGS. 1-6. Accordingly, like reference numbers in the 200 series are used in FIG. 7 to indicate like features between backrest 33 and backrest 233. The disclosure above for backrest 33 is incorporated herein for backrest 233 except where the disclosure of backrest 233 departs from the disclosure of backrest 33.

The backrest 233 includes an outer trim layer 274, a support layer 276, at least one filler layer 278, and a seat back panel 282. The outer trim layer 274 may be a cloth material, a leather material, or any other suitable material and provides an outermost layer of at least a portion of the backrest 233. The outer trim layer 274 and the back panel 282 cooperate to define an interior region 280 of the backrest 233. The support layer 276 is arranged within the interior region 280 and provides support for the seat back 32. Although not shown in FIG. 7, the support layer 276 is coupled to the seat bottom 30 and extends upwardly from the seat bottom 30 to maintain the seat back 32 in an upright position relative to the seat bottom 30. The filler layer 278 is located between the outer trim layer 274 and the support layer 276 to provide cushioning for occupants seated on the occupant support 14. The filler layer 278 is illustratively a foam material such as a polyurethane foam material or a polyethylene foam material.

The back panel 282 is coupled directly to the support layer 276 as shown in FIG. 7. In some embodiments, another filler layer (not shown) may be positioned between the back panel 282 and the support layer 276. The back panel 282 is made from a plastic material such as polyurethane or polyethylene, for example, and provides a rigid boundary for the backrest 233. In some embodiments, the back panel 282 is injection molded to form the conditioned-air passageways 24 and the air-discharge openings 36 therein. The conditioned-air passageways 24 extend through the back panel 282 and terminate at air-discharge openings 252, 258. Although not shown in FIG. 7, the back panel 282 may also be formed to include additional air-discharge openings 36 like air discharge openings 54, 58 shown in FIG. 4. In some embodiments, the conditioned-air passageways 24 are defined conduits formed separately from the back panel 282 and coupled to the back panel 282.

In some embodiments, the ventilation system for rear-row seats are integrated into the seat back of the front seats. There could be top and bottom vents. There could be controls (i.e. a control panel) in various locations such as the seat back, a door of the vehicle, an armrest of the seat, a front console, etc. A blower could be the main HVAC blower or the seat could include a booster blower in the seat itself. The seat back could also contain a method for diverting air to any of the vents using one or more valves. The seat back vents may also be fully movable and have flow adjustments. The seat back may also contain methods for conditioning the air such as TED's, refrigerants, resistive heaters, etc. Such devices may be built into the back panel with minimal connections to the seat. There could be many different types of vents integrated with the styling of the seat. The ducts in the back panel may be molded directly to the panel or applied as a separate part such as blow molds or a formed sheet of fibers.

The following numbered clauses include embodiments that are contemplated and non-limiting:

Clause 1. A vehicle comprises a front-row occupant support.

Clause 2. The vehicle of clause 1, any other clause, or any suitable combination of clauses, wherein the vehicle further comprises a rear-row occupant support.

Clause 3. The vehicle of clause 2, any other clause, or any suitable combination of clauses, wherein the vehicle further comprises a climate-control system arranged in the front-row occupant support and configured to provide a conditioned airflow moving from the front-row occupant support toward a rear-row occupant region between the front-row occupant support and the rear-row occupant support.

Clause 4. The vehicle of clause 3, any other clause, or any suitable combination of clauses, wherein the climate control system includes a plurality of conditioned-air passageways arranged to extend through an interior space formed in a seat back of the front-row occupant support.

Clause 5. The vehicle of clause 4, any other clause, or any suitable combination of clauses, wherein the climate control system further comprises a plurality of air-discharge openings formed in the seat back of the front-row occupant support and in fluid communication with the plurality of conditioned-air passageways.

Clause 6. The vehicle of clause 5, any other clause, or any suitable combination of clauses, wherein the climate control system further comprises a conditioned-air supply system configured to supply the conditioned airflow through the plurality of conditioned-air passageways and out of the plurality of air-discharge openings into the rear-row passenger region.

Clause 7. The vehicle of clause 6, any other clause, or any suitable combination of clauses, wherein the plurality of conditioned-air passageways include a vertical conditioned-air passageway that is arranged to extend vertically through the seat back of the front-row occupant support.

Clause 8. The vehicle of clause 7, any other clause, or any suitable combination of clauses, wherein the plurality of conditioned-air passageways further include a first lateral passageway arranged along a lower portion of the seat back.

Clause 9. The vehicle of clause 8, any other clause, or any suitable combination of clauses, wherein the plurality of conditioned-air passageways further includes a second lateral passageway spaced apart from the first lateral passageway along an upper portion of the seat back.

Clause 10. The vehicle of clause 9, any other clause, or any suitable combination of clauses, wherein each of the lateral passageways is in fluid communication with a at least one air-discharge opening included in the plurality of air-discharge openings.

Clause 11. The vehicle of clause 10, any other clause, or any suitable combination of clauses, wherein each of the conditioned-air passageways are defined by conduits that extend though the seat back.

Clause 12. The vehicle of clause 10, any other clause, or any suitable combination of clauses, wherein the vertical passageway is arranged midway about between a first lateral side of the front-row occupant support and a second lateral side of the front-row occupant support to establish a first clearance space between the vertical passageway and the first lateral side and a second clearance space between the vertical passageway and the second lateral side.

Clause 13. The vehicle of clause 12, any other clause, or any suitable combination of clauses, wherein the first lateral passageway is in fluid communication with first and second air-discharge openings and the second lateral passageway is in fluid communication with third and fourth air-discharge openings to locate the first clearance space between the first and third air-discharge openings and the second clearance space between the second and fourth air-discharge openings.

Clause 14. The vehicle of clause 13, any other clause, or any suitable combination of clauses, wherein the first, second, third, and fourth air-discharge openings are located in outermost corners of a rearward facing surface of the seat back.

Clause 15. The vehicle of clause 13, any other clause, or any suitable combination of clauses, wherein the first air-discharge opening is located in an uppermost and a leftmost quarter of a rearward-facing surface of the seat back, the second air-discharge opening is located in an uppermost and a right most quarter of the rearward-facing surface, the third air-discharge opening is located in a lowermost and a leftmost quarter of the rearward-facing surface, and the fourth air-discharge opening is located in a lowermost and a rightmost quarter of the rearward-facing surface.

Clause 16. The vehicle of clause 10, any other clause, or any suitable combination of clauses, wherein the conditioned-air supply system includes a fluid regulator that controls output of the conditioned airflow through the conditioned air passageways and the air-discharge openings, a thermal system that controls thermal properties of the conditioned airflow, and a controller configured to receive user inputs through a control panel to control the fluid regulator and the thermal system in response to the user inputs.

Clause 17. The vehicle of clause 16, any other clause, or any suitable combination of clauses, wherein the fluid regulator includes a blower located in the seat back, a plurality of vents that extend over each of the air-discharge openings, and at least one valve configured to open and close one or more of the conditioned-air passageways.

Clause 18. The vehicle of clause 10, any other clause, or any suitable combination of clauses, wherein front row occupant support includes an outer trim layer that at least partially defines an interior space of the front-row occupant support, a support layer arranged within the interior space, and a filler layer between the support layer and the trim layer, and the plurality of conditioned-air passageways are formed directly into the filler layer between trim layer and the support layer.

Clause 19. The vehicle of clause 10, any other clause, or any suitable combination of clauses, wherein front row occupant support includes an outer trim layer, a back panel coupled to the outer trim layer to define an interior space of the front-row occupant support, and a support layer arranged within the interior space, and the plurality of conditioned-air passageways are formed directly into the back panel.

Clause 20. An occupant support for use in a vehicle, the occupant support comprises a seat bottom.

Clause 21. The occupant support of clause 20, any other clause, or any suitable combination of clauses, further comprising a seat back coupled to the seat bottom and arranged to extend upwardly relative to the seat bottom, the seat back including a backrest and a headrest coupled to the backrest.

Clause 22. The occupant support of clause 21, any other clause, or any suitable combination of clauses, further comprising a climate control system coupled to the backrest and including a plurality of conditioned-air passageways that extend through an interior of the backrest, a plurality of air-discharge opening that open from the interior space of the backrest toward a rear-row occupant region directly behind the seat back, and a conditioned-air supply system configured to provide a conditioned airflow that is conducted through the plurality of conditioned-air passageways and out of the air-discharge openings into the rear-row occupant region.

Clause 23. The occupant support of clause 22, any other clause, or any suitable combination of clauses, wherein the plurality of air-discharge openings includes at least one air-discharge opening located in an uppermost quarter of the backrest and in a lowermost quarter of the seat back.

Clause 24. The occupant support of clause 23, any other clause, or any suitable combination of clauses, wherein the plurality of conditioned air passageways includes a vertical passageway that extends upwardly through the backrest away from the seat bottom, a first lateral passageway arranged in the uppermost quarter of the backrest, and a second lateral duct arranged in the lowermost quarter of the backrest.

Clause 25. The occupant support of clause 24, any other clause, or any suitable combination of clauses, wherein each of the conditioned-air passageways are defined by conduits that extend though the seat back.

Clause 26. The occupant support of clause 24, any other clause, or any suitable combination of clauses, wherein the vertical passageway is arranged midway about between a first lateral side of the backrest and a second lateral side of the backrest to establish a first clearance space between the vertical passageway and the first lateral side and a second clearance space between the vertical passageway and the second lateral side.

Clause 27. The occupant support of clause 26, any other clause, or any suitable combination of clauses, wherein the first lateral passageway is in fluid communication with first and second air-discharge openings and the second lateral passageway is in fluid communication with third and fourth air-discharge openings to locate the first clearance space between the first and third air-discharge openings and the second clearance space between the second and fourth air-discharge openings.

Clause 28. The occupant support of clause 27, any other clause, or any suitable combination of clauses, wherein the first, second, third, and fourth air-discharge openings are located in outermost corners of a rearward facing surface of the backrest.

Clause 29. The occupant support of clause 28, any other clause, or any suitable combination of clauses, wherein the first air-discharge opening is located in an uppermost and a leftmost quarter of a rearward-facing surface of the seat back, the second air-discharge opening is located in an uppermost and a right most quarter of the rearward-facing surface, the third air-discharge opening is located in a lowermost and a leftmost quarter of the rearward-facing surface, and the fourth air-discharge opening is located in a lowermost and a rightmost quarter of the rearward-facing surface.

Clause 28. The occupant support of clause 21, any other clause, or any suitable combination of clauses, wherein the conditioned-air supply system includes a fluid regulator that controls output of the conditioned airflow through the conditioned air passageways and the air-discharge openings, a thermal system that controls thermal properties of the conditioned airflow, and a controller configured to receive user inputs through a control panel to control the fluid regulator and the thermal system in response to the user inputs.

Clause 29. The occupant support of clause 21, any other clause, or any suitable combination of clauses, wherein backrest includes an outer trim layer that at least partially defines an interior space of the front-row occupant support, a support layer arranged within the interior space, and a filler layer between the support layer and the trim layer, and the plurality of conditioned-air passageways are formed directly into the filler layer between trim layer and the support layer.

Clause 30. The occupant support of clause 21, any other clause, or any suitable combination of clauses, wherein backrest includes an outer trim layer, a back panel coupled to the outer trim layer to define an interior space of the front-row occupant support, and a support layer arranged within the interior space, and the plurality of conditioned-air passageways are formed directly into the back panel.

The invention claimed is:

1. An occupant support for use in a vehicle, the occupant support comprising a seat bottom, a seat back coupled to the seat bottom and arranged to extend upwardly relative to the seat bottom, the seat back including a backrest and a headrest coupled to the backrest, and a climate control system coupled to the backrest and including a plurality of conditioned-air passageways that extend through an interior of the backrest, a plurality of air-discharge openings that open from the interior space of the backrest toward a rear-row occupant region directly behind the seat back, and a conditioned-air supply system configured to provide a conditioned airflow that is conducted through the plurality of conditioned-air passageways and out of the air-discharge openings into the rear-row occupant region, wherein the plurality of air-discharge openings includes at least one air-discharge opening located in an uppermost quarter of the backrest and in a lowermost quarter of the seat back, and wherein backrest includes an outer trim layer that provides a front surface of the occupant support and a back panel coupled to the outer trim layer to provide a rigid boundary for the backrest and to define an interior space of the occupant support between the front surface and the back panel, and wherein the back panel includes a forward-facing surface facing toward the interior space and a rearward-facing surface facing away from the interior space, and wherein the plurality of conditioned-air passageways are formed directly into the back panel between the forward-facing surface and the rearward-facing surface, wherein the backrest further includes a support layer arranged within the interior space and a filler layer between the support layer and the front surface of the outer trim layer, and wherein the support layer is arranged to lie between the forward-facing surface of the back panel and the filler layer.

2. The occupant support of claim 1, wherein the plurality of conditioned air passageways includes a vertical passageway that extends upwardly through the backrest away from the seat bottom, a first lateral passageway arranged in the uppermost quarter of the backrest, and a second lateral passageway arranged in the lowermost quarter of the backrest.

3. The occupant support of claim 2, wherein each of the conditioned-air passageways are defined by conduits that extend though the seat back.

4. The occupant support of claim 2, wherein the vertical passageway is arranged midway between a first lateral side of the backrest and a second lateral side of the backrest to establish a first clearance space between the vertical passageway and the first lateral side and a second clearance space between the vertical passageway and the second lateral side.

5. The occupant support of claim 4, wherein the first lateral passageway is in fluid communication with first and second air-discharge openings of the plurality of discharge openings and the second lateral passageway is in fluid communication with third and fourth air-discharge openings of the plurality of discharge openings to locate the first clearance space between the first and third air-discharge openings and the second clearance space between the second and fourth air-discharge openings.

6. The occupant support of claim 5, wherein the first, second, third, and fourth air-discharge openings are located in outermost corners of a rearward facing surface of the backrest.

7. The occupant support of claim 5, wherein the first air-discharge opening is located in an uppermost and a leftmost quarter of a rearward-facing surface of the seat back, the second air-discharge opening is located in an uppermost and a right most quarter of the rearward-facing surface, the third air-discharge opening is located in a lowermost and a leftmost quarter of the rearward-facing surface, and the fourth air-discharge opening is located in a lowermost and a rightmost quarter of the rearward-facing surface.

8. The occupant support of claim 1, wherein the conditioned-air supply system includes a fluid regulator that controls output of the conditioned airflow through the conditioned air passageways and the air-discharge openings, a thermal system that controls thermal properties of the conditioned airflow, and a controller configured to receive user inputs through a control panel to control the fluid regulator and the thermal system in response to the user inputs.

* * * * *